United States Patent [19]
Wagner et al.

[11] 3,917,996
[45] Nov. 4, 1975

[54] ELECTRIC FIELD MEASURING DEVICE

[75] Inventors: Peter B. Wagner; James W. Telford; Richard W. Hanaway, all of Reno, Nev.

[73] Assignee: The United States of America as represented by the Secretary of the Navy, Washington, D.C.

[22] Filed: July 5, 1974

[21] Appl. No.: 486,035

[52] U.S. Cl. .................. 324/72; 324/139; 324/144
[51] Int. Cl.² ......................................... G01R 31/02
[58] Field of Search ....... 324/72, 139, 144; 250/236

[56] References Cited
UNITED STATES PATENTS
3,691,392   9/1972   Tringali............................. 250/236

Primary Examiner—Alfred E. Smith
Assistant Examiner—Michael J. Tokar
Attorney, Agent, or Firm—R. S. Sciascia; Charles D. B. Curry

[57] ABSTRACT

An electric field measuring device that is particularly suited for being mounted on the nose boom of an aircraft for periodically measuring the atmospheric electric field intensity and orientation. The device includes a rotating assembly that includes a pair of capacitor plates, analog signal processing equipment, digital processing equipment, a slip ring assembly, orientation light transmitter and receiver assemblies and an information light transmitter. All of these elements are mounted on a rotatable shaft that is driven by an electric motor. The light from the rotating information light transmitter is received by a stationary information light receiver, the output of which is applied to the input of a stationary digital receiver and storage device. Floating D. C. power is transmitted by a brush assembly through the slip ring assembly to the rotating electrical equipment.

3 Claims, 3 Drawing Figures

U.S. Patent  Nov. 4, 1975  Sheet 1 of 2  3,917,996
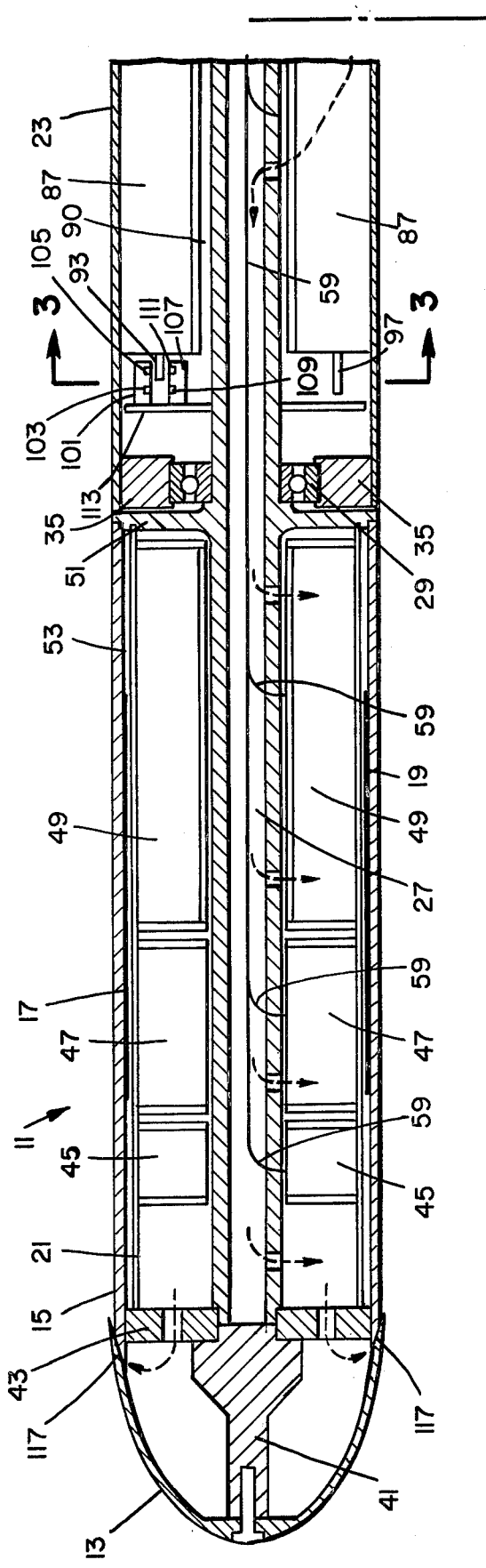
FIG_1
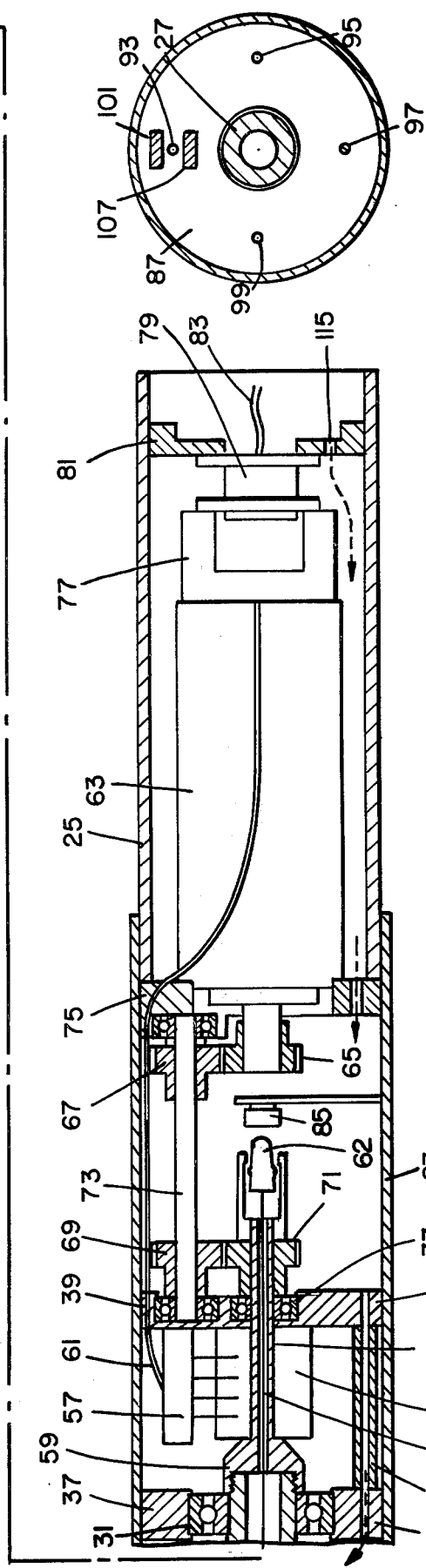
FIG_3

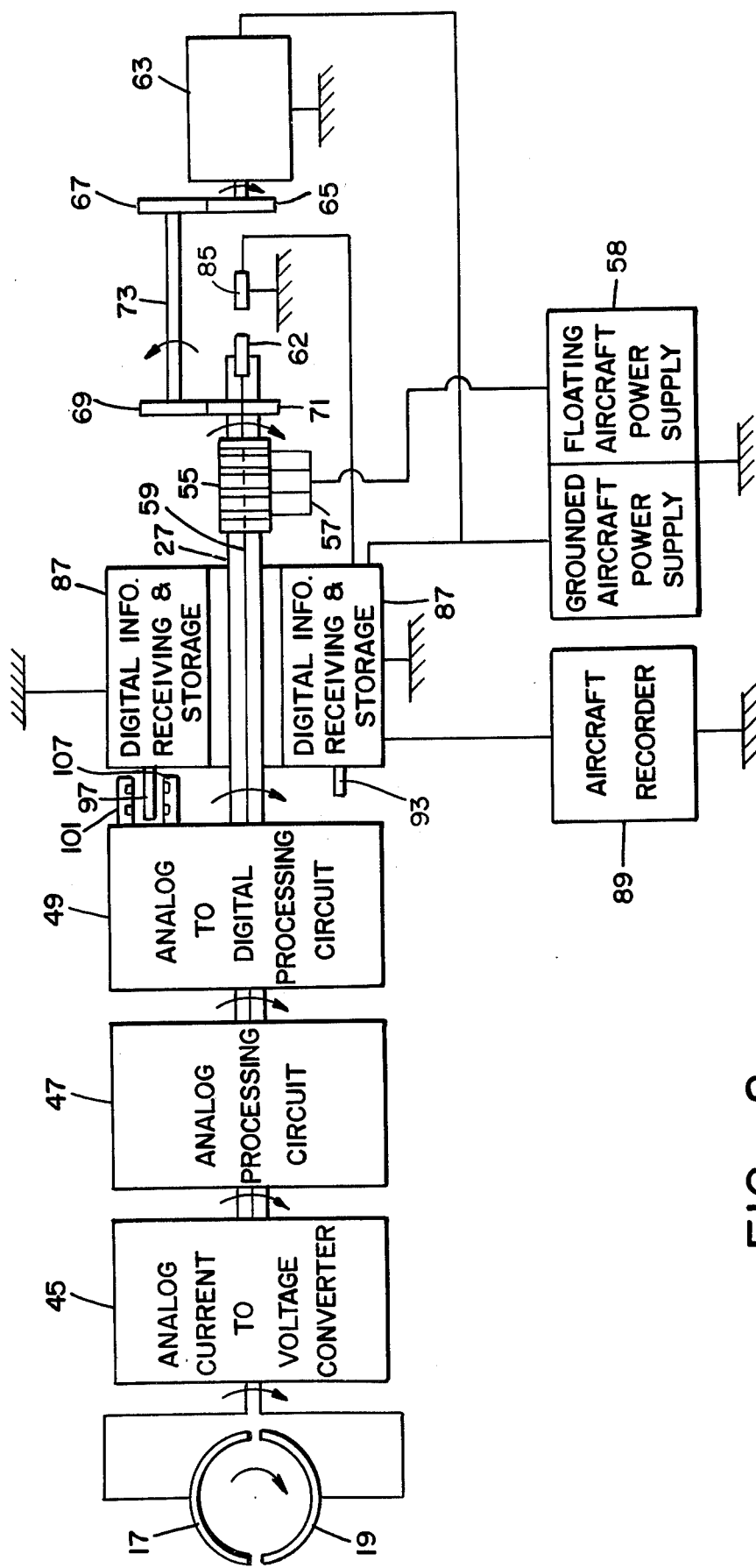
FIG_2

_3,917,996_

ELECTRIC FIELD MEASURING DEVICE

BACKGROUND OF THE INVENTION

1. Field of the Invention

The present invention relates to an electric field measuring device and more particularly to a very sensitive electric field measuring device for measuring atmospheric electric fields.

2. Description of the Prior Art

Prior rotating electric field measuring devices have been too bulky and heavy, particularly for mounting on small aircraft booms. In addition, they exhibit measuring sensitivities limited excessively by noise in brush contacts to rotating shields and/or the noise effects of brushes or other electrical coupling upon analog signal transmission between rotating and stationary members. The present invention overcomes these difficulties by employing uniquely cooperating rotating and stationary assemblies that are compact, light weight and efficient. Moreover, the present invention employs a unique optical information technique that eliminates brush noise in the transmitted information signal.

SUMMARY OF THE INVENTION

Briefly, the present invention comprises an electric field measuring device that is particularly suited for being mounted on the nose boom of an aircraft for periodically measuring the atmospheric electric field intensity and orientation. The device includes a rotating assembly that includes a pair of capacitor plates, analog signal processing equipment, digital processing equipment, a slip ring assembly, orientation light transmitter and receiver assemblies and an information light transmitter. All of these elements are mounted on a rotatable shaft that is driven by an electric motor. The light from the rotating information light transmitter is received by a stationary information light receiver, the output of which is applied to the input of a stationary digital receiver and storage device. Floating D.C. power is transmitted by a brush assembly through the slip ring assembly to the rotating electrical equipment.

STATEMENT OF THE OBJECTS OF THE INVENTION

An object of the present invention is to provide an electric field measuring device that is compact and light weight;

Another object of the present invention is to provide an electric field measuring device that is accurate and very sensitive;

Still another object of the present invention is to provide an electric field measuring device that minimizes noise in the information signal;

Still another object of the present invention is to provide an electric field measuring device that may be mounted on an aircraft to measure atmospheric field intensity;

A still further object of the present invention is to provide an electric field measuring device that may be mounted on the nose of an aircraft to measure the atmospheric field orientation; and A still further object of the present invention is to provide orientation of the rotating member with respect to the stationary member by interrupting light from optical devices;

A still further object of the present invention is to provide an electric field measuring device that optically transmits the information signal from a rotating member to a stationary member.

Other objects, advantages and novel features of the present invention will become apparent from the following detailed description of the invention when considered in conjunction with the accompanying drawings wherein:

BRIEF DESCRIPTION OF THE DRAWINGS

FIG. 1 is a side elevation of the electric field measuring device of the present invention which illustrates the overall system and the arrangement of components;

FIG. 2 is a block diagram of the electrical system of the electric field measuring device of the present invention; and FIG. 3 is a section view taken at section 3—3 of FIG. 1 and illustrates the optical orientation technique employed in the electric field measuring device of the present invention.

DESCRIPTION OF THE PREFERRED EMBODIMENT

The purpose of the electric field measuring device of the present invention is to measure the electric field in atmosphere. This is achieved by positioning the electric field measuring device at different locations within the atmospheric electric field. In accordance with the present invention this is preferably achieved by mounting the electric field measuring device on the nose of an aircraft and periodically measuring the electric field intensity and orientation as the aircraft flies through the atmosphere. The electric field is measured in two of its three vector components, namely the horizontal and vertical components. To achieve this objective the electric field measuring device is mounted to be cylindrically symmetric with the nose boom of the aircraft wherein the nose boom preferably extends several feet in front of the aircraft center. In this manner the charge on the aircraft will have a minimum effect on the field measurement made by the electric field measuring device. It is to be understood that the third or axial component of the electric field may be measured, along with either the horizontal or vertical components, by orienting a second electric field measuring device in a direction that is normal to axis of the first electric field measuring device. It is also to be understood that the noise rejection system of the electric field measuring device of the present invention may be used on any device where it is necessary to transmit power from a stationary member to a rotating member and to transmit information from a rotating member to a stationary member.

In FIG. 1 is a side elevation of the electric field measuring device 11 of the present invention which illustrates the overall system and the arrangement of components. FIG. 2 is a block diagram illustrating the electrical system of the electric field measuring device 11 of the present invention. Referring to FIG. 1, electric field measuring device 11 includes a nose cone 13, an outer cylindrical glass insulating sleeve 15, a pair of capacitive plates 17 and 19 (see also FIG. 2), an interior cylindrical shield 21, a centrally positioned outer stationary cylindrical sleeve 23 and a rearwardly positioned outer stationary cylindrical sleeve 25. Capacitive plates 17 and 19 are preferably metal foil that are mechanically and electrically separated and are attached to the interior surface of glass insulating sleeve 15.

An elongated hollow shaft 27 is rotatably supported by bearings 29, 31 and 33 which are respectively supported by metal support members 35, 37 and 39 which are supported by outer stationary cylindrical sleeve 23. The nose cone 13 is connected to the forward end of rotatable hollow shaft 27 by support members 41 and 43.

Referring to FIGS. 1 and 2 concentrically mounted on the forward section of shaft 27 are analog current to voltage converter 45, analog processing circuit 47 and analog to digital processing circuit 49. Circuits 45, 47 and 49 are packaged in a cylindrical configuration with an opening in the center. These circuits are packaged to slide over shaft 27 and within cylindrical shield 21 to provide a force fit and a rigid interconnection. Electrical plugs, not shown, are provided to electrically and mechanically interconnect these circuits. Referring to FIG. 1, a collar 51 extends from shaft 27 to support one end of sleeve 15, the other end of which is supported by support member 43. An air gap 53 is provided between sleeve 15 and shield 21 to prevent shorting of capacitive plates 15 and 17.

Cylindrically mounted on the rearward part of shaft 27, having a small diameter, is slip ring assembly 55 which is used to transmit D.C. power to circuits 45, 47 and 49. This is achieved by transmitting power to a plurality of slip rings of slip ring assembly 55 from the brushes of brush assembly 57 which are connected to a floating aircraft power supply 58. Although not shown, for reasons of clarity, each slip ring is connected to a wire which passes through the hollow section of shaft 27 to the various electrical packages 45, 47 and 49 as generally indicated by electrical cable 59. D.C. power is transmitted through cable 61 to brush assembly 57 from the floating aircraft power supply 58 of FIG. 2.

Connected to the rearward end of rotatable hollow shaft 27 is light transmitter 62 which is preferably capable of transmitting infra-red light. Light transmitter 62 is connected to the output of analog to digital processing circuit 49, as generally indicated by cable 59. Preferably circuit 49 controls light transmitter 62 to convey information by means of a pulse width modulated signal.

Shaft 27 is rotated by means of electric motor 63 through gears 65, 67, 69 and 71. Gears 67 and 69, which are connected by shaft 73, are made of a dielectric material, preferably nylon, to prevent electrical coupling between the motor armature and the rotating assembly. Electrical coupling to the rotating assembly is undesirable because the motor armature normally has brush noise.

The forward end of the electric motor 63 is supported by support member 75 which is attached to support 39. Connected to the rear end of motor 63 is electrical connector assembly 77. A connector plug 79 (having a plurality of pins, not shown) is connected to the assembly 77 and is supported by support member 81 which is connected to sleeve 25. An electrical cable 83 is connected from the connector plug 79 to the equipment on board the aircraft.

The pulse modulated light from rotating light transmitter 62 is transmitted to stationary light receiver 85. As illustrated in FIG. 2, the output of stationary light receiver 85 is applied to the input of stationary digital information receiver and storage circuit 87, the output of which is connected to an aircraft recorder 89. The package containing digital information receiver and storage circuit 87 has a cylindrical configuration, has a concentric opening 90, and is rigidly connected to stationary cylindrical sleeve 23. The concentric opening 90 is sufficiently large to allow free rotation of shaft 27.

Referring to FIGS. 1, 2 and 3, the forward end of the package containing circuit 87 has extending therefrom stationary pins 93, 95, 97 and 99. Pins 93, 95 and 99 are short and pin 97 is long. Mounted on rotating shaft is orientation light transmitting assembly 101 having light transmitters 103 and 105, and orientation light receiver 107 having light receivers 109 and 111. The light transmitter assembly 101 and the light receiver assembly 107 are mounted on support member 113 in spaced apart relationship and with light transmitter 103 in alignment with light receiver 109 and light transmitter 105 in alignment with light receiver 111. The length of short pins 93, 95 and 99 are selected to interrupt the light transmitted from light transmitter 105 and the length of pin 97 is selected to interrupt the light from light transmitters 103 as well as 105. From this it can be seen that 90°, 180°, 270° and 360° reference positions of shaft 27, and the rotating assembly, are electrically determined. Also a positive 360° reference is available because pin 97 interrupts the light from light transmitter 103 once each revolution or at 360°. This provides the required orientation of the rotating assembly with respect to the stationary assembly.

The electric field measuring device 11 of the present invention is prevented from collecting condensate, due to cooling, by passing dry air through both the stationary and rotating assemblies. This is indicated by the dotted line arrows in FIG. 1. Dry air, which is supplied by an aircraft source, enters through opening 115 in support member 81 and exits through a plurality of opening 117 formed around the periphery of the rear section of the nose cone 13. It should be noted however, that the section containing the slip ring assembly 55 and brush assembly 57 is sealed and dry air is bypassed through conduit 119.

The dielectric cylinder 15 is preferably made of glass. Although glass has lesser dielectric characteristics then teflon, teflon is not employed because it can maintain an unwanted charge on the surface due to handling and the like. Also capacitor plates 17 and 19 are preferably mounted on the interior of the sleeve to maintain them in a dry condition rather than on the exterior.

What is claimed is:
1. An electric field measuring device comprising:
   a. a rotatable assembly;
   b. a stationary assembly;
   c. said rotatable assembly including means for providing an electrical signal that contains information defining a condition;
   d. said electrical signal being operably connected to an optical transmitter;
   e. said optical transmitter being operably connected to said rotatable assembly;
   f. an optical receiver being operably connected to said stationary assembly and positioned to provide an optical coupling with the optical signal from said optical transmitter;
   g. said rotatable assembly including a sleeve made of dielectric material;
   h. said means includes first and second capacitor plates and signal processing means;
   i. said first and second capacitor plates being spaced apart and operably connected to said sleeve;
   j. said first and second capacitor plates being operably connected to the input of said signal processing means; and k. the output of said signal processing means being operably connected to the input of said optical transmitter.

2. The device of claim 1 including:

a. an orientation optical transmitter assembly and an orientation optical receiver assembly being operably connected to said rotatable assembly and being spaced apart and spaced from the rotational axis of said rotatable assembly; and b. an orientation means operably connected to said stationary assembly for interrupting the transmission of energy from said orientation optical transmitter assembly to said orientation optical receiver assembly.

3. The device of claim 2 wherein:

a. said orientation means including a plurality of spaced apart pins wherein one of said pins has a greater length than the other pins to provide a rotational orientation with respect to the other pins.

* * * * *